(12) United States Patent
Williams et al.

(10) Patent No.: US 8,520,679 B1
(45) Date of Patent: Aug. 27, 2013

(54) TRUNKING DISTRIBUTION SYSTEMS AND METHODS

(75) Inventors: Robert Williams, Cupertino, CA (US); Gopal S. Krishna, San Jose, CA (US)

(73) Assignee: Advanced Medical Devices, Inc., Sunnyvale, CA (US)

( * ) Notice: Subject to any disclaimer, the term of this patent is extended or adjusted under 35 U.S.C. 154(b) by 2003 days.

(21) Appl. No.: 09/767,683

(22) Filed: Jan. 24, 2001

(51) Int. Cl.
*H04L 12/28* (2006.01)

(52) U.S. Cl.
USPC .................................. 370/392; 370/395.3

(58) Field of Classification Search
USPC ................. 370/357, 389, 390, 391, 392, 400, 370/395.3
See application file for complete search history.

(56) References Cited

U.S. PATENT DOCUMENTS

| | | | |
|---|---|---|---|
| 5,848,297 A * | 12/1998 | Krein et al. | 710/56 |
| 5,978,951 A * | 11/1999 | Lawler et al. | 714/758 |
| 6,092,108 A * | 7/2000 | DiPlacido et al. | 709/224 |
| 6,359,879 B1 * | 3/2002 | Carvey et al. | 370/351 |
| 6,430,188 B1 * | 8/2002 | Kadambi et al. | 370/398 |
| 6,597,661 B1 * | 7/2003 | Bonn | 370/235 |

FOREIGN PATENT DOCUMENTS

| | | |
|---|---|---|
| EP | 0 910 195 A2 | 4/1999 |
| EP | 0 910 195 A3 | 4/1999 |
| WO | WO 99/00950 | 1/1999 |
| WO | WO 00/72531 A1 | 11/2000 |

\* cited by examiner

*Primary Examiner* — Jason Mattis
(74) *Attorney, Agent, or Firm* — Harrity & Harrity, LLP (57) ABSTRACT

A multiport switch distributes conversations over links in a trunk. The multiport switch includes receiver ports, transmitter ports, and a routing engine. The receiver ports receive data frames belonging to one or more of the conversations. The transmitter ports transmit the received data frames over the links in the trunk. The routing engine distributes the conversations over the links in the trunk by identifying at least one field in each of the received data frames, assigning each of the received data frames to a corresponding one of the one or more conversations based on the identified fields, and selecting the links in the trunk over which to transmit the received data frames based on the conversation assignments.

22 Claims, 5 Drawing Sheets

| ADDRESS 0 | L1 |
| --- | --- |
| ADDRESS 1 | L2 |
| ⋮ | ⋮ |
|  | LN |
|  | L1 |
|  | L2 |
| ⋮ | ⋮ |
|  | LN |
|  | L1 |
| ⋮ | ⋮ |
| ADDRESS M-1 | LK |

TRUNKING DISTRIBUTION SYSTEMS AND METHODS

TECHNICAL FIELD

The present invention relates generally to communication systems and methods and, more particularly, to distributing communication evenly over links of a trunk.

BACKGROUND ART

Trunking or link aggregation is a scheme for incrementally increasing the bandwidth of a point-to-point link by treating a group of parallel links as a single logical link. The IEEE 802.3ad standard guarantees that frames are received in the correct order by requiring that all frames in a single conversation travelling in the same direction be transmitted over the same link (or logical link).

A conversation may be defined as a sequence of frames that must be delivered in order. Some conventional techniques consider all frames that include the same combination of media access control (MAC) source address and destination address as being included in the same conversation. A problem with using MAC addresses to discriminate between conversations is that if a trunk is established between two routers, most of the traffic in one direction would have the same combination of MAC source and destination addresses.

Conventional network switches use trunking distribution schemes to determine which link in a trunk a particular frame of a conversation will be sent over. Some schemes try to evenly distribute traffic over the individual links of a trunk and others bias the traffic distribution such that high priority frames are transmitted over lightly used links. Conventional trunking distribution schemes, such as schemes that use the MAC source and destination addresses to distribute traffic over links of a trunk, however, typically result in an uneven distribution.

DISCLOSURE OF THE INVENTION

There exists a need for a trunk distribution scheme that more evenly distributes traffic to the ports of a multiport switch. This and other needs are met by the present invention, where better discrimination between conversations and more even distribution of the conversations over the links in a trunk are provided.

Additional advantages and other features of the invention will be set forth in part in the description that follows and in part will become apparent to those having ordinary skill in the art upon examination of the following or may be learned from the practice of the invention. The advantages and features of the invention may be realized and obtained as particularly pointed out in the appended claims.

According to the present invention, the foregoing and other advantages are achieved in part by a multiport switch that distributes conversations over links in a trunk. The multiport switch includes receiver ports, transmitter ports, and a routing engine. The receiver ports receive data frames belonging to one or more of the conversations. The transmitter ports transmit the received data frames over the links in the trunk. The routing engine distributes the conversations over the links in the trunk by identifying at least one field in each of the received data frames, assigning each of the received data frames to a corresponding one of the one or more conversations based on the identified fields, and selecting the links in the trunk over which to transmit the received data frames based on the conversation assignments.

In another implementation consistent with the present invention, a system distributes conversations over links of a trunk. The system includes a trunk table that stores link identifiers and conversation identifier logic. The conversation identifier logic assigns a data frame to one of the conversations based on at least one field of the data frame, generates an address relating to the trunk table and corresponding to the one conversation, uses the generated address to obtain one of the link identifiers from the trunk table, and identifies one of the links in the trunk on which to transmit the data frame based on the one link identifier.

In yet another implementation consistent with the present invention, a method for distributing packets over links in a trunk includes receiving a plurality of packets; identifying at least one field in each of the received packets; assigning each of the received packets to a corresponding conversation based on the at least one field; and selecting the links in the trunk over which to transmit the received packets based on the conversation assignments.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, where elements having the same reference number designation represent like elements throughout.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
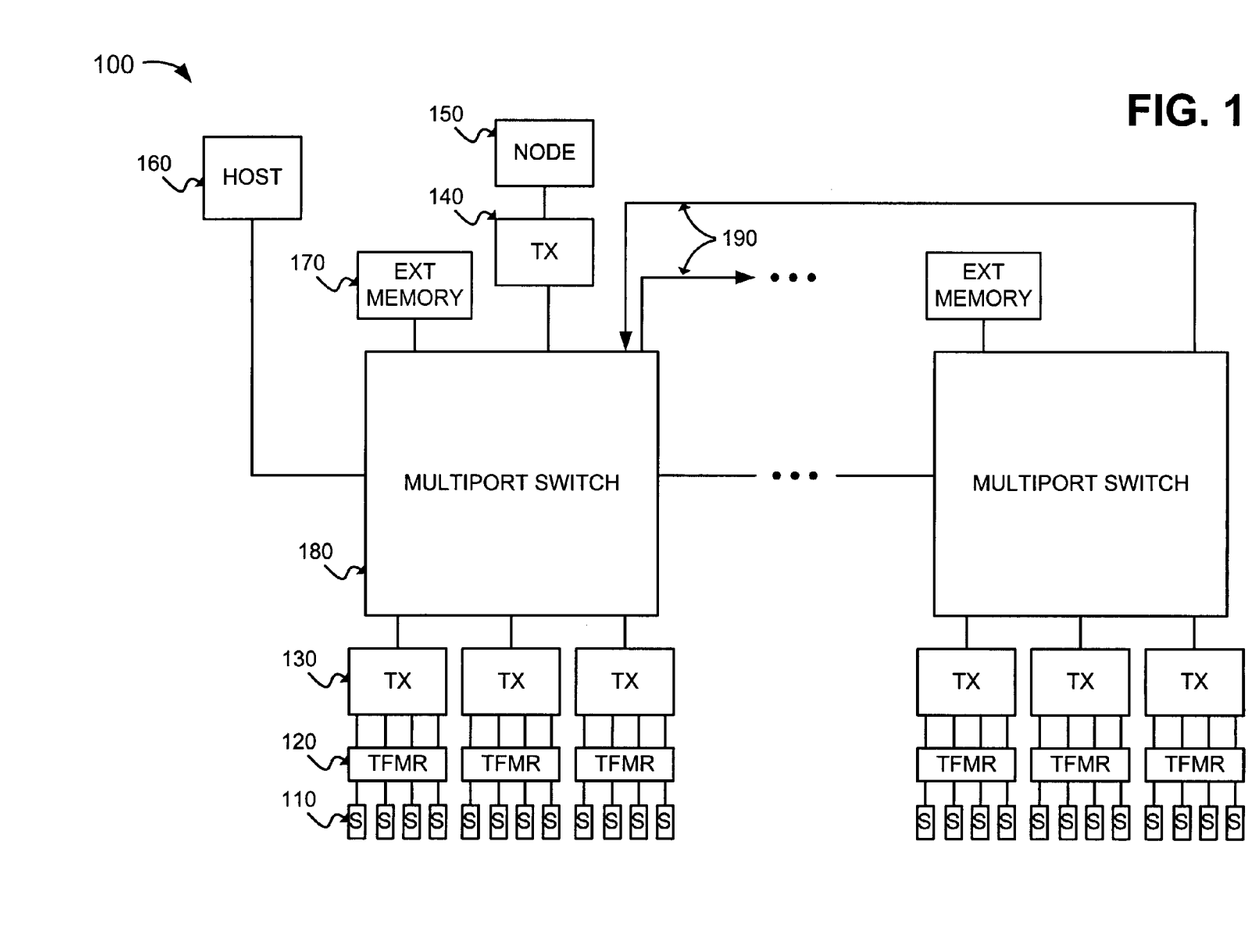
FIG. 1 is a block diagram of an exemplary system in which systems and methods consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
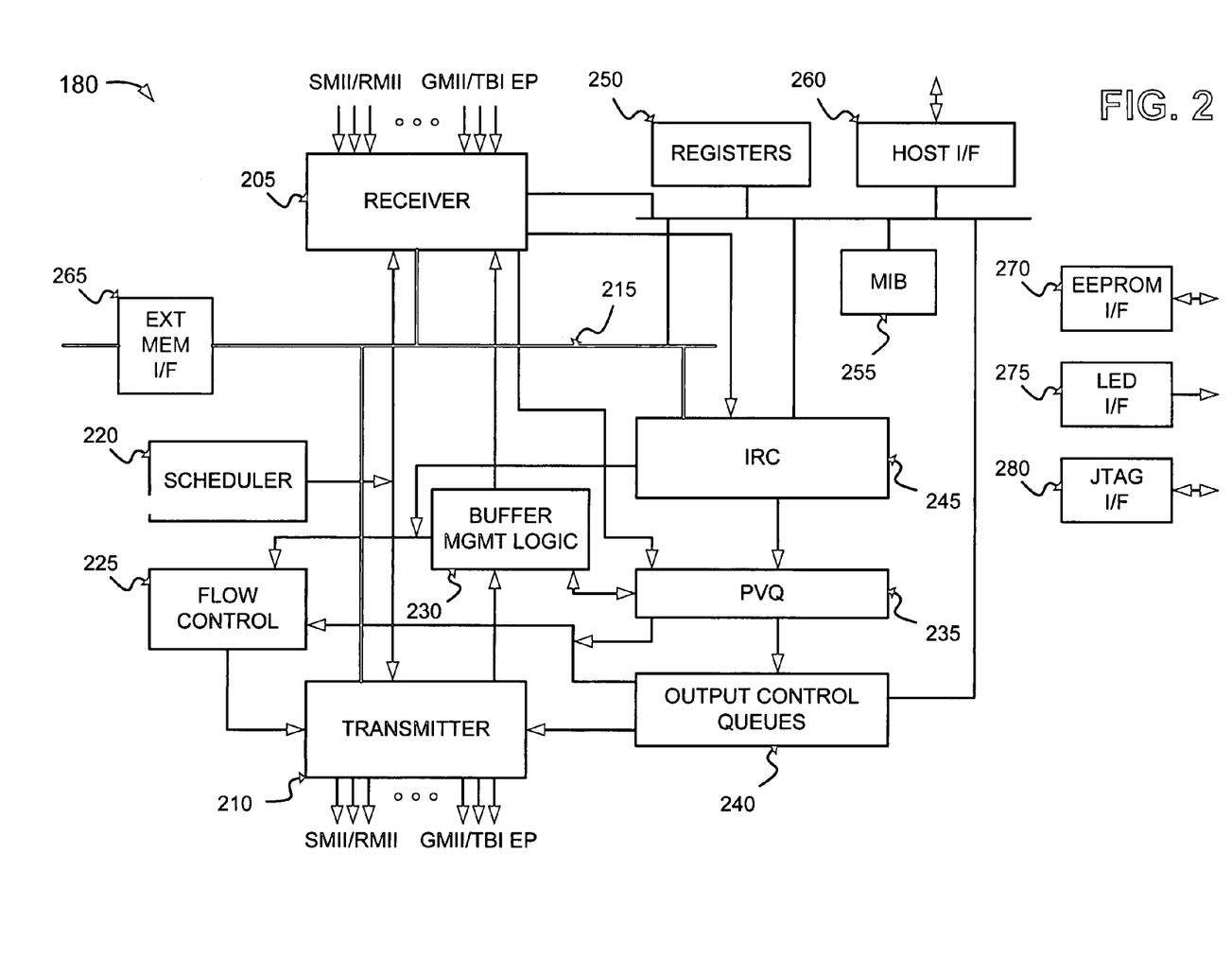
FIG. 2 is a detailed diagram of a multiport switch of FIG. 1 according to an implementation consistent with the present invention.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded). The IRC 245 may alternatively determine that a data frame should be transferred to another multiport switch 180 via the expansion port. Therefore, the IRC 245 determines whether a frame temporarily stored in the external memory 170 should be output to a single output port, multiple output ports, no output port, or another multiport switch 180.

The IRC 245 may treat multiple output ports as links in a trunk. For example, the multiport switch 180 may support up to three independent trunks, each of which may consist of two to four ports. The IRC 245 may distribute data frames of a conversation over multiple links of the trunk, as described in more detail below.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in the multiport switch 180 is provided below.

Exemplary Internal Rules Checker

The present invention is directed to the IRC 245 and, more particularly, to logic within the IRC 245 for distributing conversations evenly over the links in a trunk. As described previously, the IRC 245 makes frame forwarding decisions for data packets that are received by the multiport switch 180. In an implementation consistent with the present invention, the IRC 245 uses a combination of three or more fields of a frame to assign the frames to conversations and distributes the conversations evenly over the links in a trunk.

Figure 3:
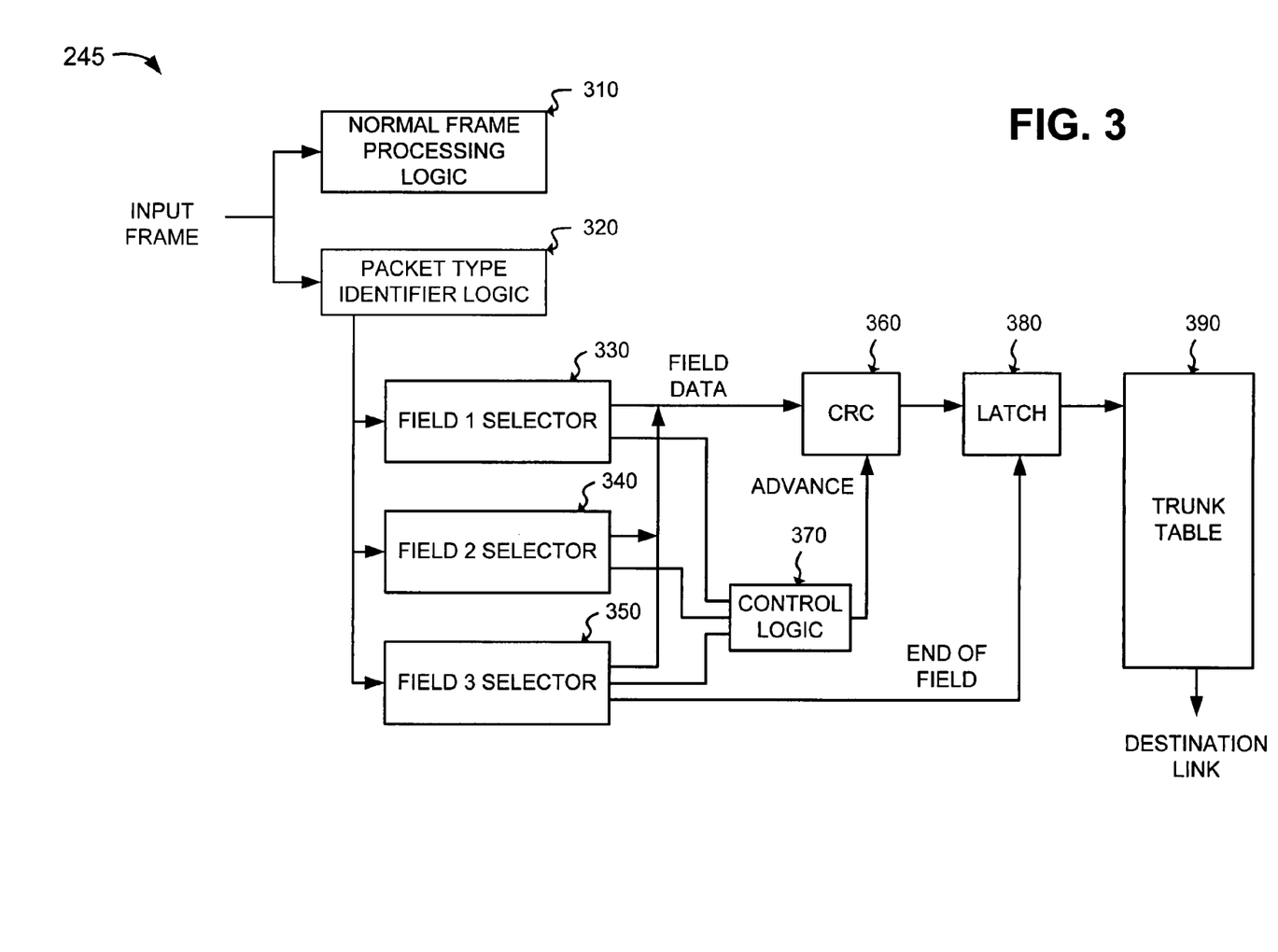
FIG. 3 is a detailed diagram of the internal rules checker of FIG. 2 according to an implementation consistent with the present invention.

FIG. 3 is an exemplary diagram of the IRC 245 according to an implementation consistent with the present invention. The IRC 245 may include normal frame processing logic 310, packet type identifier logic 320, field selectors 330, 340, and 350, cyclic redundancy code (CRC) generator 360, control logic 370, latch 380, and trunk table 390. The normal frame processing logic 310 may include logic to receive a data frame and process the data frame in the manner described above. For example, the normal frame processing logic 310 may include logic for performing layer 3 filtering.

The packet type identifier logic 320 may include logic to receive and examine a data frame. For example, the packet type identifier logic 320 may analyze the length, type, and/or other fields of the data frame to determine the start of the IP packet. The packet type identifier logic 320 may send the data frame to the field selectors 330, 340, and 350. Each of the field selectors 330, 340, and 350 may use conventional techniques to identify one or more particular fields in the data frame. Some parameters of the data frame may be programmable. For example, the displacement of a field with respect to the start of the IP packet and the length of a field may be programmable. To minimize costs, these parameters may be fixed.

According to an implementation consistent with the present invention, the fields selected by the field selectors 330, 340, and 350 may be used to assign a frame to a conversation. In this implementation, the field selectors 330, 340, and 350 may identify three fields: the IP source address field, the IP destination address field, and the Transmission Control Protocol (TCP) or User Datagram Protocol (UDP) port number field. The field selectors 330, 340, and 350 may extract the data from the identified fields and send the field data to the CRC generator 360. The CRC generator 360 may include conventional CRC logic to receive the data from the three fields and perform CRC processing on the data to obtain a conversation identifier. The control logic 370 may include logic to control processing by the CRC generator 360. For example, the control logic 370 may include an OR gate to notify the CRC generator 360 when one of the fields is available for processing.

The CRC generator 360 outputs the conversation identifier to the latch 380. The latch 380 may include a register or buffer that temporarily stores the conversation identifier. The latch 380 may use the conversation identifier as an index into the trunk table 390. The trunk table 390 may include a table of link numbers.

Figure 4:
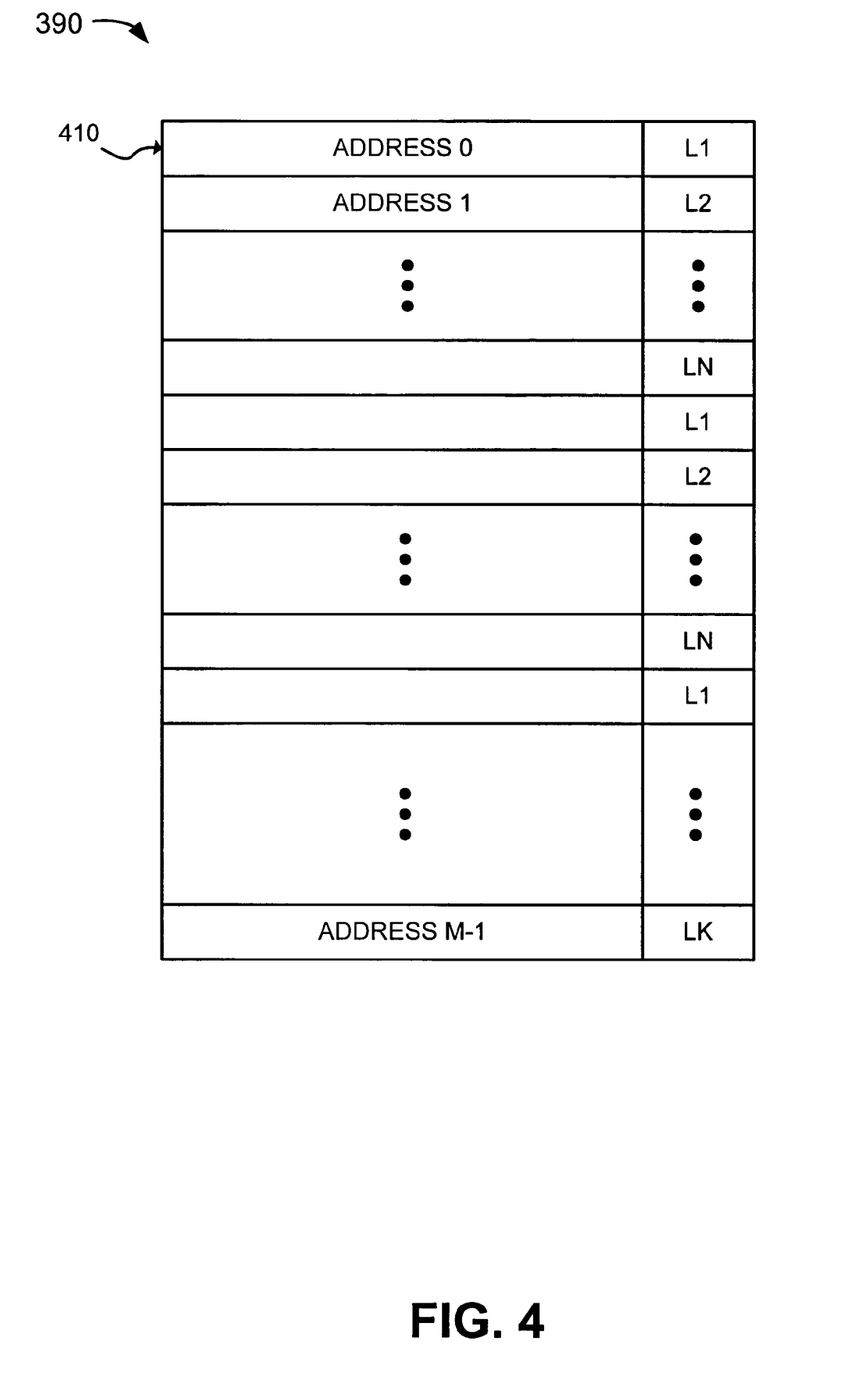
FIG. 4 is an exemplary diagram of the trunk table in an implementation consistent with the present invention.

FIG. 4 is an exemplary diagram of the trunk table 390 in an implementation consistent with the present invention. The trunk table 390 may include M entries 410 having addresses 0 through M−1, where M is a power of two. In one implementation consistent with the present invention, M is 64. Each entry 410 may also include a link number that identifies a link within a trunk. In this example, the link numbers range from 1 to N and K is a number between 1 and N.

To distribute the conversations evenly over the links, the number of each link in the trunk should appear in the table 390 approximately the same number of times. For example, if the table has 64 entries 410 and there are five links in the trunk, each link number should appear in the table 390 64/5 times. In this case, four of the link numbers may appear thirteen times and the fifth number may appear twelve times.

A simple way to load the table 390 is to load the numbers L1 through LN in order over and over starting at address 0 and continuing until the table 390 is full. Other loading techniques may alternatively be used. In an implementation consistent with the present invention, the host 160 controls the table loading operation.

Exemplary Processing

Figure 5:
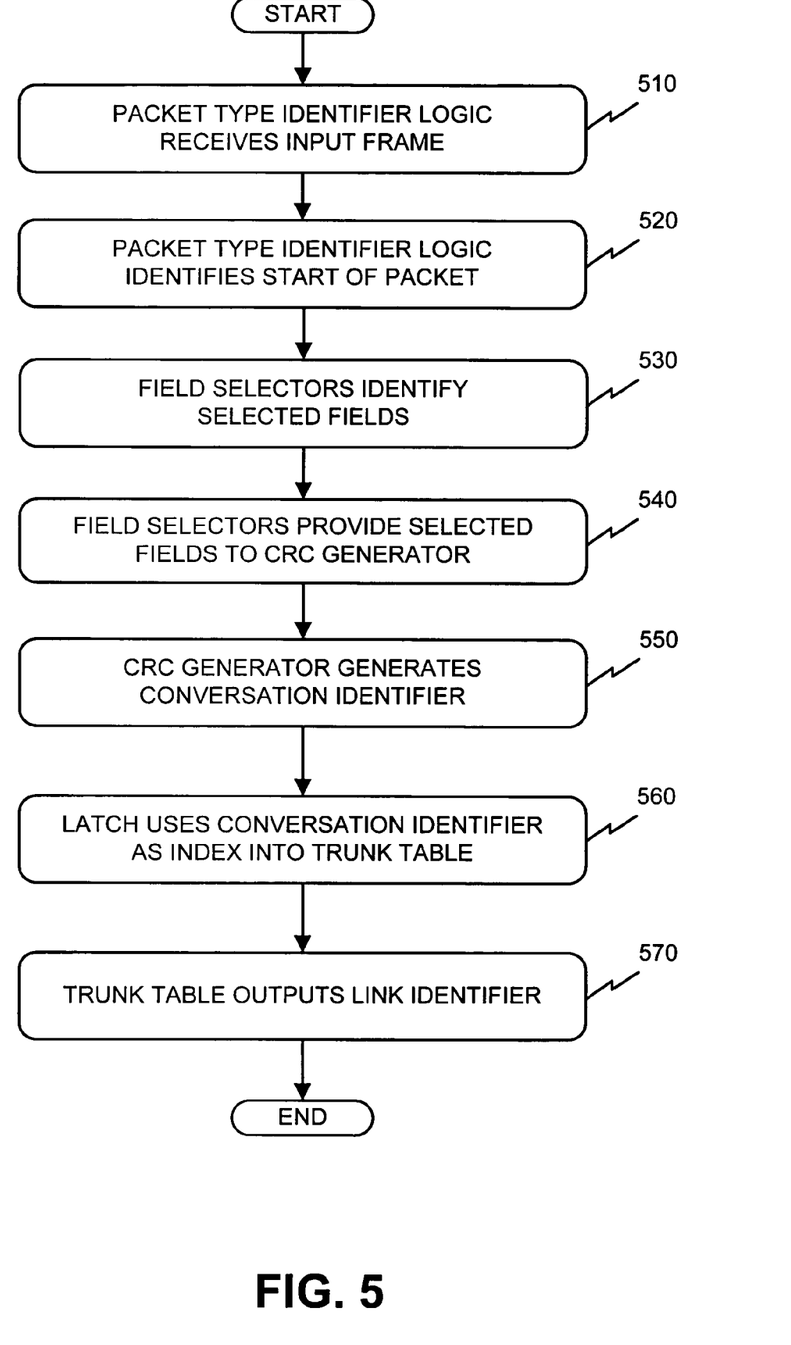
FIG. 5 is a flowchart of exemplary processing for distributing conversations evenly over links in a trunk.

FIG. 5 is a flowchart of exemplary processing for distributing conversations evenly over links in a trunk. Processing may begin when the IRC 245 (FIGS. 2 and 3) receives a frame of data of a packet received by the multiport switch 180 or, alternatively, a portion of a data frame including the frame header information. The normal frame processing logic 310 may process the data frame or the portion of the data frame in the manner described above. The packet type identifier logic 320 receives the data frame [step 510] and analyzes the data frame. For example, the packet type identifier logic 320 may examine the length, type, and other fields to determine the start of the IP packet [step 520].

The field selectors 330, 340, and 350 may identify one or more select fields in the data frame [step 530]. For example, the field selectors 330, 340, and 350 may identify the IP source address, the IP destination address, and the TCP or UDP port number, respectively. Using these fields to assign the frame to a conversation means that traffic from two different end stations (e.g., network stations 110) passing through the same switch 180 would very likely be assigned to different conversations. The field selectors 330, 340, and 350 may send the selected fields in series to the CRC generator 360 [step 540].

In order to distribute conversations evenly over the links in the trunk, the CRC generator 360 may process the selected fields to generate a CRC that may be used as a conversation identifier [step 550]. It does not matter that frames from different end stations may be considered as part of the same conversation, as long as the frames from the same conversation are delivered in the same order. The CRC generator 360 stores the conversation identifier in the latch 380. The latch 380 may use the conversation identifier as an index into the trunk table 390 [step 560]. In other words, the latch 380 may use the conversation identifier as an address that corresponds to an entry 410 in the table 390. The entry 410 stores a link identifier (i.e., link number) of the link on which the frame should be output from the multiport switch 180 [step 570].

Described has been a system and method for identifying conversations and distributing the conversations evenly over the links of a trunk. Advantages of the present invention include maximizing the efficiency and data throughput of the multiport switch 180.

Only the preferred embodiments of the invention and a few examples of its versatility are shown and described in the present disclosure. It is to be understood that the invention is capable of use in various other combinations and environments and is capable of modifications within the scope of the inventive concept as expressed herein. For example, the IRC 245 has been described as a combination of logic components. The functions of the logic components may be implemented in software, hardware, or a combination of software and hardware.

Also, it has been described that the CRC generator 360 is used to distribute conversations evenly over the links in a trunk. Different techniques may be used in other implementations consistent with the present invention. For example, an adder may be used to calculate the sum of the bytes from the selected fields. J bits from the result may then be used as the index into the table 390, where J may be the $\log_2$ of the table length N, such that $N=2_J$.

What is claimed is:

1. A system comprising:
a memory to store a plurality of link identifiers at a respective plurality of memory addresses; and
logic, at least partially implemented in hardware, to:
receive a data unit,
determine data associated with a plurality of fields of the data unit, the determined data including:
first data associated with an Internet Protocol (IP) source address associated with the data unit,
second data associated with an IP destination address associated with the data unit, and
third data associated with at least one of a Transmission Control Protocol (TCP) port number associated with the data unit or a User Datagram Protocol (UDP) port number associated with the data unit, generate a particular memory address, of the respective plurality of memory addresses, based on hashing a sum of the first data, the second data, and the third data, the logic, when generating the particular memory address, being further to:

determine a quantity of memory addresses included in the respective plurality of memory addresses, determine a first quantity of bits needed to express the quantity of memory addresses, determine a binary representation of the sum of the first data, the second data, and the third data, the binary representation of the sum including a second quantity of bits that is larger than the first quantity of bits, remove one or more bits from the binary representation of the sum of the first data, the second data, and the third data to form a modified binary representation, the modified binary representation including only the first quantity of bits, and use, as the particular memory address, the modified binary representation, identify a particular link identifier, of the plurality of link identifiers, stored at the particular memory address, and cause the data unit to be transmitted based on the particular link identifier.

2. The system of claim 1, where the logic includes:

a plurality of field selectors, each of the plurality of field selectors being to identify one or more fields, of the plurality of fields, of the data unit.

3. The system of claim 2, where the plurality of field selectors include:

a first field selector to identify a first field, of the data unit, associated with the first data, a second field selector to identify a second field, of the data unit, associated with the second data, and a third field selector to identify a third field, of the data unit, associated with the third data.

4. The system of claim 1, where the memory, when storing the plurality of link identifiers, is further to:

store each of the plurality of link identifiers a plurality of times, the memory storing each of the plurality of link identifiers approximately a same quantity of times.

5. The system of claim 1, where each of the plurality of link identifiers identifies a link number.

6. The system of claim 1, where the logic, when causing the data unit to be transmitted based on the particular link identifier, is further to:

identify, based on the particular link identifier, at least one port, of a plurality of ports, to transmit the data unit, forward, to one or more of the plurality of ports, a forwarding descriptor, the forwarding descriptor including:

information identifying the at least one port, and information identifying a priority class associated with the data unit.

7. A method comprising:

storing, by a device, a plurality of link identifiers at a plurality of memory addresses in a memory, a quantity of link identifiers included in the plurality of link identifiers being smaller than a quantity of memory addresses including in the plurality of memory addresses;

identifying, by the device, data associated with at least one field in a received data unit, the identified data including:

first data associated with an Internet Protocol (IP) source address associated with the data unit, second data associated with an IP destination address associated with the data unit, and third data associated with at least one of a Transmission Control Protocol (TCP) port number associated with the data unit or a User Datagram Protocol (UDP) port number associated with the data unit;

generating, by the device, a particular memory address, of the plurality of memory addresses, based on hashing a sum of the first data, the second data, and the third data, generating the particular memory address including:

determining a first quantity of bits needed to express the quantity of memory addresses included in the plurality of memory addresses, determining a binary representation of the sum of the first data, the second data, and the third data, the binary representation of the sum including a second quantity of bits that is larger than the first quantity of bits, removing one or more bits from the binary representation of the sum of the first data, the second data, and the third data to form a modified binary representation, the modified binary representation including only the first quantity of bits, and using, as the particular memory address, the modified binary representation;

obtaining, by the device, one of the plurality of link identifiers, the one of the plurality of link identifiers being stored at the particular memory address; and selecting, by the device and based on the one of the plurality of link identifiers, one of a plurality of links in a trunk to transmit the data unit.

8. The method of claim 7, where identifying the data associated with the at least one field in the received data unit includes:

assigning the data unit to a particular conversation, of a plurality of conversations, based on one of the first data, the second data, or the third data, and identifying another one of the first data, the second data, or the third data based on data associated with the particular conversation.

9. The method of claim 7, where storing the plurality of link identifiers further includes:

storing each of the plurality of link identifiers in the memory approximately a same quantity of times.

10. The method of claim 7, where each of the plurality of link identifiers identifies a link number.

11. A device, comprising:

a memory to store a plurality of link identifiers at a respective plurality of memory addresses, each of the plurality of link identifiers identifying a respective one of a plurality of links in a trunk;

one or more receiver ports to receive data frames associated with one or more conversations;

a plurality of transmitter ports to transmit the received data frames over the plurality of links in the trunk; and a routing engine to distribute the one or more conversations over the plurality of links in the trunk, the routing engine, when distributing the one or more conversations, being further to:

identify data associated with the received data frames, the identified data including:
  first data associated with an Internet Protocol (IP) source address associated with the received data frames,
  second data associated with an IP destination address associated with the received data frames, and
  third data associated with at least one of a Transmission Control Protocol (TCP) port number associated with the received data frames or a User Datagram Protocol (UDP) port number associated with the received data frames,
identify a particular memory address, of the plurality of memory addresses, based on hashing a sum of the first data, second data, and the third data,
the routing engine, when identifying the particular memory address, being further to:
  determine a quantity of memory addresses included in the respective plurality of memory addresses,
  determine a first quantity of bits needed to express the quantity of memory addresses,
  determine a binary representation of the sum of the first data, the second data, and the third data,
    the binary representation of the sum including a second quantity of bits that is larger than the first quantity of bits,
  remove one or more bits from the binary representation of the sum of the first data, the second data, and the third data to form a modified binary representation,
    the modified binary representation including only the first quantity of bits, and
  use, as the particular memory address, the modified binary representation,
  determine a particular link identifier, of the plurality of link identifiers, stored at the particular memory address in the memory, and
  cause the received data frames to be transmitted via a particular link, of one of the plurality of links in the trunk, associated with the particular link identifier.

12. The device of claim 11, where the routing engine, when identifying the data, is further to:
identify respective fields, in the received data frames, associated with the first data, the second data, and the third data, and
retrieve the first data, the second data, and the third data from the respective fields.

13. The device of claim 11, where the memory, when storing the plurality of link identifiers, is further to:
store approximately a same quantity of copies of each of the plurality of link identifiers.

14. The device of claim 11, where each of the plurality of link identifiers identifies a link number.

15. The device of claim 11, further comprising:
an OR gate coupled to the routing engine,
  the OR gate outputting a signal to the routing engine to indicate that at least one field, in the received data frames, is available,
    the routing engine identifying the data from the at least one field based on receiving the signal from the OR gate.

16. A method comprising:
storing, by a device, a plurality of link identifiers at a plurality of memory addresses in a memory,
  the plurality of link identifiers identifying a respective plurality of links in a trunk;
receiving, by the device, a packet;
identifying, by the device, data associated with the packet, the identified data including:
  first data associated with an Internet Protocol (IP) source address associated with the packet, and
  second data associated with an IP destination address associated with the packet;
identifying, by the device, a particular memory address, of the plurality of memory addresses, based on hashing a sum of the first data and the second data,
  identifying the particular memory address including:
    determining a quantity of memory addresses included in the plurality of memory addresses,
    determining a first quantity of bits needed to express the quantity of memory addresses,
    determining a binary representation of the sum of the first data and the second data,
      the binary representation of the sum including a second quantity of bits that is larger than the first quantity of bits,
    removing one or more bits from the binary representation of the sum of the first data and the second data to form a modified binary representation,
      the modified binary representation including only the first quantity of bits, and
    using, as the particular memory address, the modified binary representation; and
  determining, by the device, a particular link identifier stored at the particular memory address,
    the received packet being transmitted via a corresponding link, of the respective plurality of links, associated with the particular link identifier.

17. The method of claim 16, where the identified data further includes:
third data associated with a Transmission Control Protocol (TCP) associated with the packet or a User Datagram Protocol (UDP) port number field associated with the packet, and
where identifying the particular memory address further includes:
  identifying the particular memory address further based on hashing a sum of the first data, the second data, and the third data.

18. The method of claim 16, where identifying the particular memory address includes:
hashing the sum of the first data and the second data based on performing cyclic redundancy code (CRC) processing on the first data and the second data.

19. The method of claim 16, where storing the plurality of link identifiers includes:
storing each of the plurality of link identifiers a plurality of times,
  each of the plurality of link identifiers being stored approximately a same quantity of times.

20. The method of claim 16, where identifying the data includes:
identifying a conversation, of a plurality of conversations, associated with the packet; and
identifying the first data and the second data based on, respectively, an Internet Protocol (IP) source address associated with the conversation and an IP destination address associated with the conversation.

21. The method of claim 20, further comprising:
receiving another packet associated with the conversation; and causing the other packet to be transmitted via the particular link associated with the particular link identifier.

22. The method of claim 16, where the respective plurality of links correspond to a respective plurality of ports associated with the device.

* * * * *

UNITED STATES PATENT AND TRADEMARK OFFICE
CERTIFICATE OF CORRECTION

| | | |
|---|---|---|
| PATENT NO. | : 8,520,679 B1 | Page 1 of 1 |
| APPLICATION NO. | : 09/767683 | |
| DATED | : August 27, 2013 | |
| INVENTOR(S) | : Robert Williams and Gopal S. Krishna | |

It is certified that error appears in the above-identified patent and that said Letters Patent is hereby corrected as shown below:

Title Page, Item (73) Assignee: should read

-- Advanced Micro Devices, Inc., Sunnyvale, CA (US) --.

Signed and Sealed this
Nineteenth Day of November, 2013

Teresa Stanek Rea
*Deputy Director of the United States Patent and Trademark Office*